March 9, 1948.　　　　K. FISCHER　　　　2,437,247
SPECIFIC GRAVITY INDICATOR
Filed May 15, 1944　　　　3 Sheets-Sheet 1
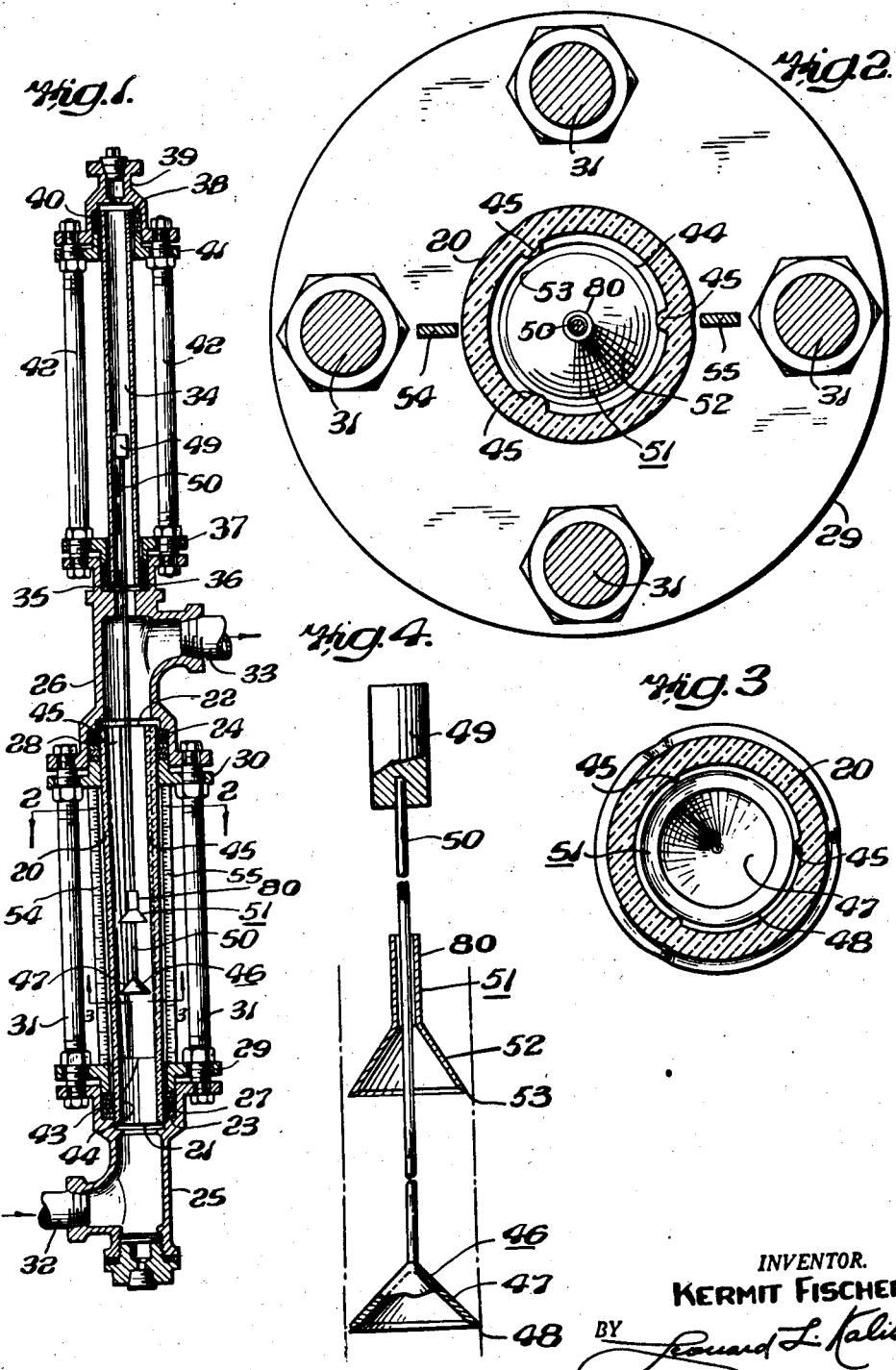
INVENTOR.
KERMIT FISCHER
BY Leonard L. Kalish
ATTORNEY.

March 9, 1948.   K. FISCHER   2,437,247
SPECIFIC GRAVITY INDICATOR
Filed May 15, 1944   3 Sheets-Sheet 2
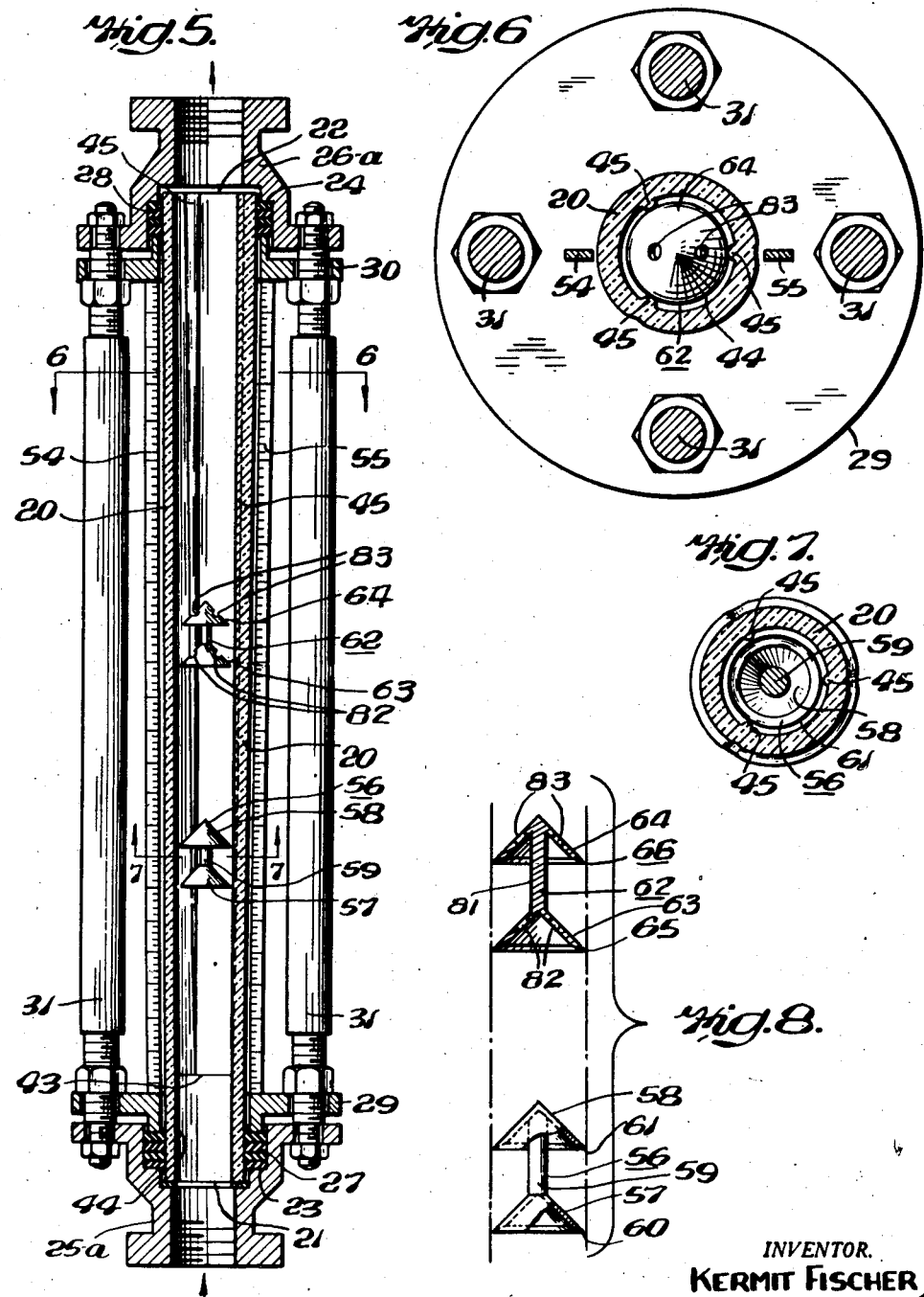
INVENTOR.
KERMIT FISCHER
BY Leonard L. Kalish
ATTORNEY.

March 9, 1948.    K. FISCHER    2,437,247
SPECIFIC GRAVITY INDICATOR
Filed May 15, 1944    3 Sheets-Sheet 3
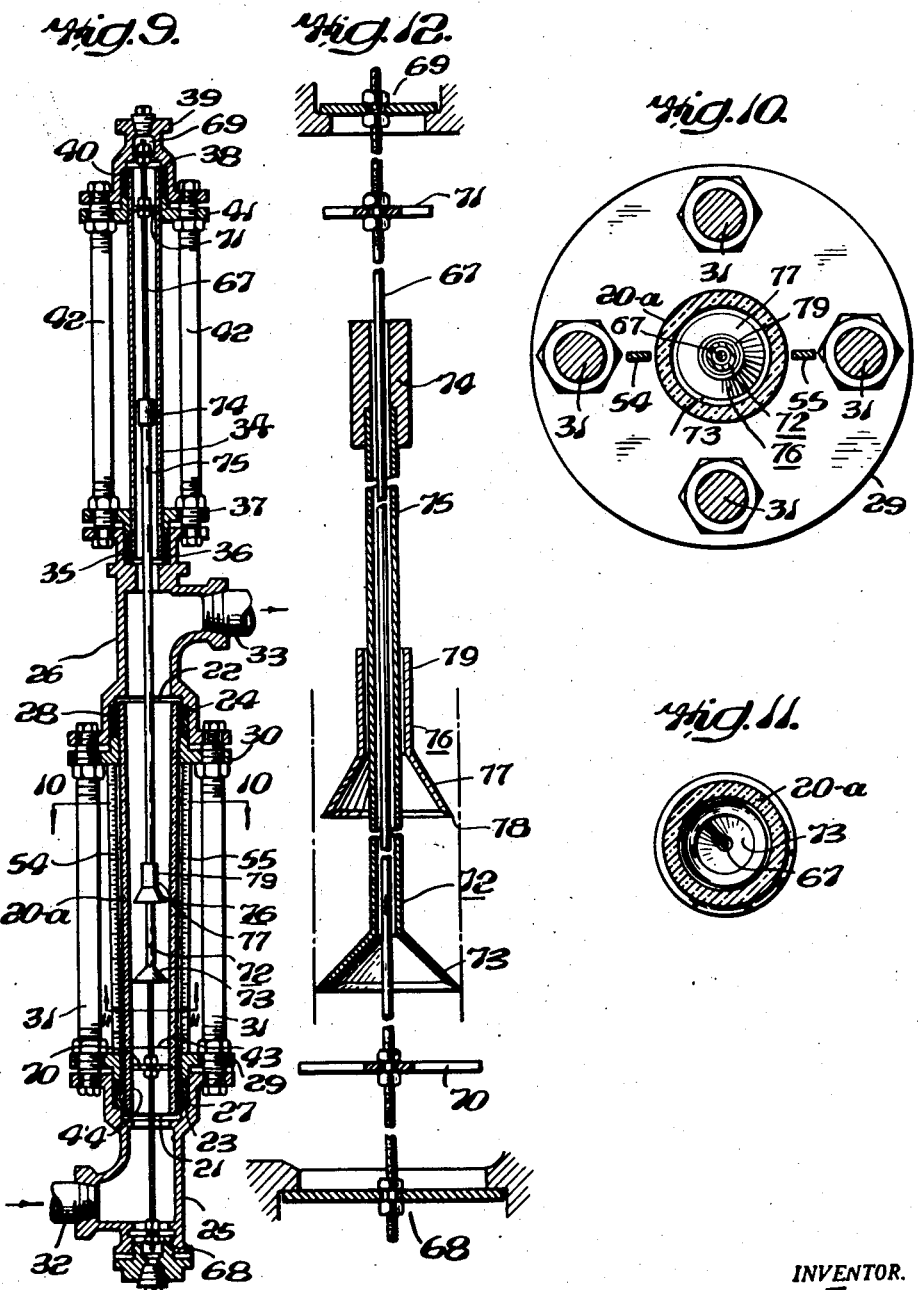
INVENTOR.
KERMIT FISCHER
BY
ATTORNEY Patented Mar. 9, 1948

2,437,247

UNITED STATES PATENT OFFICE 2,437,247

SPECIFIC GRAVITY INDICATOR

Kermit Fischer, Bridge Valley, Pa.

Application May 15, 1944, Serial No. 535,627

7 Claims. (Cl. 73—33)

The present invention relates to a certain new and useful method of and apparatus for determining the specific gravity of fluids in motion, for example, through a pipe-line.

An object of the present invention is to provide a simple, dependable and reasonably accurate method for determining, and maintaining a constant check upon, the specific gravity of a fluid in motion, as, for instance, fluids in transit in industrial chemical processes, without having to remove any of the fluid from the pipe-line or the like. A further object of the present invention is to provide dependable and inexpensive apparatus for determining, and maintaining a constant check upon, the specific gravity of a fluid in motion, for example through a pipe-line.

Other objects and advantages of the present invention will be apparent in the following detailed description, appended claims and accompanying drawings.

Heretofore, it has usually been necessary, in order to determine the specific gravity of a fluid in motion (for example through a pipe-line or the like) to withdraw a sample of the fluid and to test it for specific gravity in conventional apparatus.

It is apparent that these conventional methods were inadequate since it is very often impractical to stop the flow of fluid while the specific gravity is thus being tested so that it was impossible continuously to determine, and maintain a check upon, the specific gravity of a fluid.

In my co-pending applications Serial No. 368,246, filed December 2, 1940, now U. S. Patent No. 2,348,732, issued May 16, 1944, and Serial No. 472,452, filed January 15, 1943, now U. S. Patent No. 2,348,733, issued May 16, 1944, I have disclosed a novel method of and apparatus for determining the specific gravity of fluids flowing through a pipe-line or the like by passing the fluid through a rate-of-flow-indicating device relatively insensitive to changes in specific gravity and viscosity of the fluid, and through another indicating device sensitive to rate-of-flow and also to changes in specific gravity but relatively insensitive to changes in viscosity of the fluid—the devices being connected in series.

More specifically, my co-pending applications referred to hereinabove disclose a method of, and apparatus for, determining the specific gravity of fluids in motion through pipe-lines or the like by passing the fluid through two series-connected variable-orifice rate-of-flow meters of the type commonly known as rotameters; one of the rotameters having a metering float of novel construction whereby its flow-rate-indicating position is relatively independent of and unaffected by variations in specific gravity and/or viscosity and the other rotameter having a metering float whose flow-rate-indicating position is relatively independent of and unaffected by variations in viscosity but is affected by and dependent on variations in the specific gravity of the fluid being metered. The difference in the readings of the two series-connected rotameters disclosed in my above copending applications gives a constant indication of the specific gravity of the flowing fluid and the variations in this difference in readings give a continuous indication of the variations in the specific gravity of the flowing fluid from time to time.

My present invention contemplates a further improved method of, and apparatus for, determining the specific gravity of a flowing fluid whereby such determination can be made more quickly and easily and whereby simplified and less expensive apparatus is required.

Generally speaking, according to my present invention, the specific gravity of a flowing fluid can be determined by passing the fluid through a rotameter tube wherein are disposed two separate metering floats; one float being insensitive to and unaffected by variations in specific gravity and viscosity (so that its position is determined solely by the rate-of-flow) and the other float being insensitive to and unaffected by variations in viscosity but being sensitive to and affected by variations in both specific gravity and rate-of-flow. In this way, the specific gravity of the flowing fluid can be determined by the difference in the positions of the two metering floats and the variations in the specific gravity of the fluid can be determined by the corresponding variations in the difference of the positions of the two floats.

For the purpose of illustrating the invention, there are shown in the accompanying drawings forms thereof which are at present preferred, since the same have been found in practice to give satisfactory and reliable results, although it is to be understood that the various instrumentalities of which the invention consists can be variously arranged and organized and that the invention is not limited to the precise arrangements and organizations of the instrumentalities as herein shown and described.

Referring to the accompanying drawings in which like reference characters indicate like parts throughout:

Figure 1 represents a vertical cross-sectional view of one embodiment of the present invention.

Figure 2 represents a horizontal cross-sectional view, on an enlarged scale, generally along the line 2—2 of the Figure 1.

Figure 3 represents a horizontal cross-sectional view, on the same scale as Figure 2, generally along the line 3—3 of Figure 1.

Figure 4 represents an elevational view, on an enlarged scale, of the metering float assembly of Figure 1; parts being broken away better to reveal the construction thereof.

Figure 5 represents a vertical cross-sectional view of another embodiment of the present invention.

Figure 6 represents a horizontal cross-sectional view, on an enlarged scale, generally along the line 6—6 of Figure 5.

Figure 7 represents a horizontal cross-sectional view, on the same scale as Figure 6, generally along the line 7—7 of Figure 5.

Figure 8 represents a schematic elevational view, on an enlarged scale, of the float assembly of Figure 5, parts being broken away better to reveal the construction thereof.

Figure 9 represents a vertical cross-sectional view of still another embodiment of the present invention.

Figure 10 represents a horizontal cross-sectional view, on an enlarged scale, generally along the line 10—10 of Figure 9.

Figure 11 represents a horizontal cross-sectional view, on the same scale as Figure 10, generally along the line 11—11 of Figure 9.

Figure 12 represents a schematic cross-sectional view, on an enlarged scale, of the float assembly of Figure 9.

In one embodiment of the present invention shown in Figures 1 to 4 I may provide a vertical metering tube 20 (to be hereinafter described in detail) having its lower and upper ends 21 and 22 disposed in fluid-tight relationship within stuffing-boxes 23 and 24 of lower and upper rotameter "heads" or "fittings" 25 and 26 respectively; fluid-tight seals being provided by lower and upper packing rings 27 and 28 and lower and upper stuffing-glands 29 and 30 in conventional manner. The heads 25 and 26 are held in spaced relationship by a plurality (for example four) of spacer rods or posts 31; the lower head is adapted to be screw-threadedly connected to a horizontal inlet pipe-line 32 while the upper head 26 is adapted to be screw-threadedly connected to a horizontal outlet pipe-line 33.

A generally cylindrical extension tube or chamber 34 is mounted upon the upper end of the upper head 26 in axial alignment with the metering tube 20. The lower end of the extension tube 34 is connected in fluid-tight relationship within an upper stuffing-box 35 formed in said head 26 by means of packing rings 36 and a stuffing-gland 37.

The upper end of the extension tube 34 is mounted in fluid-tight relationship within the stuffing-box 38 of an uppermost fitting 39 by means of packing rings 40 and a stuffing-gland 41; the fitting 39 being mounted in spaced relationship upon the head 26 by means of a plurality (for example four) of spacer rods or posts 42.

The metering tube 20, which, specifically, is the subject of my co-pending application Serial No. 535,624, filed May 15, 1944, is downwardly tapered throughout most of its length, that is from its upper end 22 to the point 43; a cylindrical inner bore 44 being provided at the lower portion of the tube 20, that is from the point 43 to the lower end 21.

A plurality (for example three) of uniformly-circumferentially-distributed inwardly-protruding axially-extending float-guiding beads 45 are provided upon the tapered inner bore of said metering tube 20. The tips of the beads 45 extend generally parallel to the axis of the tube 20 and in direct continuation of the cylindrical inner bore 44. That is, the beads 45 are relatively pronounced at the upper larger end of the tube 20 and gradually become less pronounced downward along the tapered bore of the tube until they fade out completely at the point 43.

As will be hereinafter described, the beads 45 provide parallel float-guiding shoulders or lands which serve to center the metering float along the axis of the tube.

A main metering float 46 is mounted within the tubes 20 and 34 as shown particularly in Figure 1.

The float 46, as can best be seen in Figure 4, includes a lowermost flow-constricting head portion 47 which is operatively disposed within the metering tube 20. The head portion 47 is in the form of a conical or cup-shaped member opening towards the lower inlet end 21 of the metering tube 20. The head portion 47 may be provided with a beveled periphery 48; the periphery 48 passing close to the tips of the float-guiding beads 45 as can be seen particularly in Figure 3 so that the metering head 47 is maintained in position generally at the axis of the metering tube 20.

The main metering float 46 also includes an uppermost weight-giving body portion 49 which is disposed within the extension tube 34; the metering head 47 and the body portion 49 being connected by a thin elongated rod 50.

It is apparent that the main metering float 46 is maintained in position generally axially of the metering tube 20 and is kept from "wobbling" by the novel supporting and guiding structure herein described. That is, the novel construction described hereinabove, which is the subject of my co-pending application Serial No. 535,625, filed May 15, 1944, prevents "wobbling" or tilting or other undesirable oscillation of the metering float due to the fact that the lowermost head portion 47 is centered by the float-guiding beads 45 while the uppermost body portion 49 and the connecting rod 50 are centered by the extension tube 34.

Where the extra weight is not needed, the weight-giving portion 49 may be omitted entirely; in which case, the extension tube 34 is made small in diameter so as more snugly to receive and guide the upwardly-extending rod 50.

As is well known in the art, the flow-constricting head portion 47 will move vertically within the metering tube 20 responsive to variations in the rate-of-flow of fluid upwardly therethrough; the position of the head portion 47 within the tube 20 (as read off against suitable calibrations, which either may be applied directly to the outside of the tube or may be applied to a separate scale disposed in juxtaposition to the tube) being an indication of the rate-of-flow of fluid upwardly through the tube 20.

As disclosed in my co-pending application Serial No. 409,048, filed August 30, 1941, now Patent No. 2,350,343, issued June 6, 1944, the novel cup-shaped metering head construction described above gives rate-of-flow readings which are relatively insensitive to and unaffected by variations in the viscosity of the fluid. So far as I now know, this is due to the extreme turbulence in fluid flow-pattern which is caused by the fluid-entrapping pocket construction of the metering head.

In other words, the position of the flow-constricting head 47 of the main metering float 46 within the metering tube 20 is a measure of the rate-of-flow of fluid upwardly through said tube.

I also provide, within the metering tube 20, a secondary float 51. The float 51 is provided with a concave, conical flow-constricting head portion 52 having a beveled periphery 53; an apertured neck 80 extending upwardly from the head 52.

The secondary float 51 (which, by reason of its cup-shaped head portion, is also generally independent of viscosity variations) has a lower specific gravity than the main float 46.

That is, the main float has a specific gravity considerably greater than the specific gravity of the fluid being metered, or, in other words, it has a substantial negative buoyancy relative to the fluid. The secondary float 51, on the other hand, has a specific gravity only slightly greater than that of the fluid (that is slightly greater than the maximum specific gravity which the fluid is expected to attain), or, in other words, it has only slight negative buoyancy relative to the fluid.

I have found that, due to the relatively large difference in specific gravity between it and the fluid, the flow-rate-indicating position of the main float 46 is relatively insensitive to and unaffected by such variations in specific gravity of the fluid as are ordinarily likely to occur while the fluid is passing through the pipe-line.

I have found, on the other hand, that, due to the relatively slight difference in specific gravity between it and the fluid, the position of the secondary float 51 is appreciably affected by variations in the specific gravity of the flowing fluid.

Thus, the difference in readings of the two floats is an indication of the specific gravity of the fluid and variations in this difference in readings are an indication of corresponding variations in said specific gravity.

Due to the relatively slight negative buoyancy of the secondary float 51, it would normally tend to rise rapidly within the metering tube with relatively slight increase in the rate-of-flow; that is, the secondary float would normally ascend much more rapidly than the main float with relatively slight increase in flow-rate.

In order to eliminate the need for an abnormally long and impractical metering tube, I prefer to so construct the secondary float that this tendency to rise rapidly with increasing rate-of-flow is partially neutralized. This can be done by making the periphery 53 of the secondary float 51 smaller in diameter than the periphery 48 of the main metering float 46. In this way, the annular orifice intermediate the periphery 53 and the tapered inner bore of the tube 20 is greater than the annular orifice intermediate the periphery 48 and the tapered inner bore of the metering tube 20. Thus, a greater fluid bypass is provided across the secondary float and, consequently, the tendency to rise with increase in rate-of-flow is reduced, thereby partially counteracting the normal tendency of the relatively light secondary float to rise rapidly with increase in rate-of-flow.

Separate scales 54 and 55 may be provided adjacent the metering tube 20 for the main float and the secondary float so that the positions of the two floats can be read off against their respective scales to determine the specific gravity and variations therein.

In Figures 5 to 8 I have shown another embodiment of the present invention wherein a vertical, beaded metering tube 20 (similar to that described hereinabove) has its lower and upper ends 21 and 22 mounted within the stuffing-boxes 23 and 24 of lower and upper heads 25—a and 26—a; fluid-tight seals being effected by means of lower and upper packing rings 27 and 28 and lower and upper stuffing-glands 29 and 30. In this case, the heads 26—a and 26—a (which are spaced apart by spacing rods or posts 31) are adapted for connection to a lower vertical inlet-line (not shown) and an upper vertical outlet-line (not shown); there being no extension tube corresponding to the tube 34 of Figure 1. Within the metering tube 20 I may provide a main metering float 56, which is specifically the subject of my copending application Serial No. 535,625, filed May 15, 1944.

The float 56 includes lower and upper flow-constricting concave or conical metering heads 57 and 58 opening toward the lower inlet end 21 of the metering tube 20; the heads 57 and 58 being connected by a thin connecting rod 59 disposed generally axially of said float.

The beveled peripheries 60 and 61 of the lower and upper metering heads 57 and 58 respectively have the same diameter and pass close to the tips of the float-guiding beads 45 as shown particularly in Figure 7; the float 56 being guided thereby along the axis of the tube 20.

As disclosed in my co-pending application Serial No. 535,625, filed May 15, 1944, the double-cone metering float 56 is generally insensitive to and unaffected by variations in fluid viscosity so that its position within the metering tube is determined solely by the rate-of-flow of fluid upwardly through said tube.

Within the metering tube 20 I may provide a secondary float 62. The float 62 has lower and upper downwardly-opening conical flow-constricting heads 63 and 64 having beveled peripheries 65 and 66 respectively; the heads 63 and 64 being connected by a thin central axially-extending connecting rod or portion 81.

The peripheries 65 and 66 of the heads 63 and 64 are generally the same in diameter as the peripheries 60 and 61 of the main float 56 so that they, too, are guided by the tips of the beads 45 to maintain the secondary float 61 generally at the axis of the tube 20.

The secondary float 62 is also generally independent of viscosity variations due to the pocket-like fluid-entrapping heads 63 and 64 thereof.

However, the secondary float 62 has an appreciably lower specific gravity than the main float 56.

That is, the main float 56 has a relatively high specific gravity so that it has relatively greater negative buoyancy relative to the fluid and, therefore, is relatively insensitive to and unaffected by such variations in specific gravity of the fluid as would ordinarily be encountered during passage of the fluid through a pipe-line or the like.

The secondary float 62, on the other hand, has a specific gravity only slightly greater than the specific gravity of the fluid (that is slightly greater than the maximum specific gravity which the fluid is expected to attain), or, in other words, has only slight negative buoyancy. As discussed hereinabove in connection with the embodiment of Figure 1, this causes the secondary float 62 to be sensitive to and affected by variations in specific gravity of the fluid so that, again, the difference in the positions of the two floats is an indication of the specific gravity of the fluid and variations in this difference are an indication of corresponding variations in the specific gravity of the flowing fluid.

In order partially to neutralize the tendency of the relatively light secondary float 62 to move up rapidly within the metering tube 20 upon relatively slight increase in flow-rate, I may provide the lower and upper heads 63 and 64 with by-pass openings 82 and 83 respectively. As described hereinabove in connection with the embodiment of Figure 1, increase in the area of the by-pass opening across the secondary float reduces its tendency to rise with increase in rate-of-flow, so that the metering tube 20 need not be made excessively long.

It is apparent that the positions of the two floats (as read off against their respective scales 54 and 55) are an indication of the specific gravity of the fluid and that variations in this difference in reading indicate corresponding variations in the specific gravity of the flowing fluid.

In Figures 9 to 12 I have shown still another modification of the present invention. In this embodiment, I may provide an unbeaded tapered metering tube 20—a which is vertically mounted intermediate lower and upper heads 25 and 26 of the frame in the same manner as described hereinabove in connection with the embodiment of Figure 1.

An extension tube 34 is provided at the upper end of the upper head 26 as also described in connection with the embodiment of Figure 1.

Since the metering tube 20—a does not have float-guiding beads formed thereon, it is necessary to provide a guide-rod 67 (extending axially along the metering tube 20—a and the extension tube 34) which is mounted at its ends in the lower head 25 and the uppermost fitting 39; screw-threaded adjustment means being provided for said guide-rod 67 at its lower and upper ends as at 68 and 69 respectively.

Lower and upper spiders 70 and 71 may be provided upon the guide-rod 67, the lower spider 70 being generally adjacent the lower end of the metering tube 20—a and the upper spider 71 being generally adjacent the upper end of the extension tube 34.

In this embodiment I may provide a main metering float 72 having a lowermost conical flow-constricting head portion 73 disposed within the metering tube 20—a, an apertured weight-giving body portion 74 disposed within the extension tube 34 and a thin elongated tube 75 connecting the head portion 73 and the body portion 74.

As can be seen particularly in Figure 12, the float 72 is slidably mounted upon the guide-rod 67 and is adapted for free up-and-down movement therealong.

This construction is disclosed in my co-pending application Serial No. 409,048, filed August 30, 1941, now Patent No. 2,350,343, issued June 6, 1944. The metering float 72 is generally insensitive to and unaffected by variations in fluid viscosity so that its position within the metering tube 20—a is determined solely by the rate-of-flow of fluid passing upwardly through said tube.

A secondary float 76 is provided within the metering tube 20—a. The secondary float 76 includes a downwardly-opening conical head portion 77 having a beveled periphery 78 and includes an apertured neck portion 79 extending upwardly from said head 77. The secondary float 76 is slidably mounted upon the connecting tube 75 of the main float 72.

The secondary float 76, due to its fluid-entrapping turbulence-creating cup-shaped head portion 77, is generally insensitive to and unaffected by variations in viscosity.

However, the secondary float 76 has a specific gravity appreciably less than that of the main float 72.

That is, the main float 72 has a specific gravity appreciably greater than that of the fluids (that is, an appreciable negative buoyancy) so that it is relatively insensitive to and unaffected by such variations in specific gravity as might be expected to occur during passage of the fluid through the pipe-line or the like.

The secondary float 76, on the other hand, has a specific gravity only slightly greater than that of the fluids (that is slightly greater than the maximum specific gravity which the fluid can be expected to attain). Thus, as discussed hereinabove, the secondary float 76 is sensitive to and affected by variations in the specific gravity of the fluid.

It is apparent, therefore, that the difference in the readings of the two floats is an indication of the specific gravity of the fluid and that variations in this difference in readings indicate corresponding variations in the specific gravity of the flowing fluid.

In order partially to neutralize the normal tendency of the relatively light secondary float to rise rapidly with increase in rate-of-flow, I prefer to make the periphery 78 of said float 76 somewhat less than the periphery of the main metering float 72 as shown particularly in Figure 12. This gives a greater area of by-pass opening across the secondary float 76 thus reducing the float's tendency to rise with increase in rate-of-flow and eliminating the necessity for excessive length in the metering tube 20—a.

It is apparent that the difference in positions of the two floats (as read off against their respective scales 54 and 55) indicates the specific gravity of the fluid and that variations in this difference of readings indicate corresponding variations in the specific gravity of the flowing fluid.

While for purposes of simplicity of illustration, the scales 54 and 55 have been shown as disposed on opposite sides of the metering tube, the present invention contemplates that the scales can be arranged in different ways. Thus, for example, the scales may be close to each other adjacent the front part of the tube so that the position of the floats can be read off against the scales by observing the floats through the small space intervening the scales.

The present invention may be embodied in other specific forms without departing from the spirit or essential attributes thereof, and it is therefore desired that the present embodiments be considered in all respects as illustrative and not restrictive, reference being had to the appended claims rather than to the foregoing description to indicate the scope of the invention.

Having thus described the invention, what I claim as new and desire to protect by Letters Patent is:

1. A device for determining the specific gravity of a moving fluid which comprises a downwardly-tapered metering tube adapted for upward flow of fluid therethrough, a metering float disposed within said tube and adapted for up-and-down movement therewithin responsive to variations in fluid rate-of-flow, said float being relatively insensitive to variations in fluid specific gravity and having a flow-constricting head portion and an elongated stem extending upwardly from said head portion, and a second metering float disposed within said tube, said second float being sensitive to variations in both rate-of-flow and specific gravity, said second float being provided with a central axial opening and being mounted upon said stem for free up-and-down movement therealong.

2. A device for determining the specific gravity of a moving fluid which comprises a downwardly-tapered metering tube adapted for upward flow of fluid therethrough, a metering float disposed within said tube and adapted for up-and-down movement therewithin responsive to variations in fluid rate-of-flow, said float being relatively insensitive to variations in fluid specific gravity and having a flow-constricting head portion and an elongated stem extending upwardly from said head portion, and a second metering float disposed within said tube, said second float being sensitive to variations in both rate-of-flow and specific gravity, said second float being provided with a central axial opening and being mounted upon said stem for free up-and-down movement therealong, said tube being provided with a plurality of circumferentially-spaced inwardly-protruding axially-extending beads providing parallel line-contacts for float-guidance.

3. A device for determining the specific gravity of a moving fluid which comprises a downwardly-tapered metering tube adapted for upward flow of fluid therethrough, a metering float having a flow-constricting head-portion disposed within said tube and adapted for up-and-down movement therewithin responsive to variations in fluid rate-of-flow, said float being relatively insensitive to variations in fluid specific gravity and a second metering float disposed within said tube above the head-portion of said first-mentioned float, said second float being sensitive to variations in both rate-of-flow and specific gravity, said tube being provided with a plurality of circumferentially-spaced inwardly-protruding axially-extending beads providing parallel line-contacts for float guidance.

4. A device for determining the specific gravity of a moving fluid which comprises a downwardly-tapered metering tube adapted for upward flow of fluid therethrough, a metering float disposed within said tube and adapted for up-and-down movement therewithin responsive to variations in fluid rate-of-flow, said float being relatively insensitive to variations in fluid specific gravity, and having at least two axially-spaced flow-constricting head portions and an intervening reduced-diameter connecting portion, and a second metering float disposed within said tube above said first-mentioned float, said second float being sensitive to variations in both rate-of-flow and specific gravity, said tube being provided with a plurality of circumferentially-spaced inwardly-protruding axially-extending beads providing parallel line-contacts for float guidance.

5. A device for determining the specific gravity of a moving fluid which comprises a downwardly-tapered metering tube adapted for upward flow of fluid therethrough, a metering float disposed within said tube and adapted for up-and-down movement therewithin responsive to variations in fluid rate-of-flow, said float being relatively insensitive to variations in fluid specific gravity and having a flow-constricting head portion and an elongated hollow stem extending upwardly from said head portion, a second metering float disposed within said tube, said second float being sensitive to variations in both rate-of-flow and specific gravity, said second float being provided with a central axial opening and being mounted upon said stem for free up-and-down movement therealong, and a thin taut guide-wire extending along the axis of said tube and through said stem.

6. A device for determining the specific gravity of a moving fluid which comprises a downwardly-tapered metering tube adapted for upward flow of fluid therethrough, a metering float disposed within said tube and adapted for up-and-down movement therewithin responsive to variations in fluid rate-of-flow, said float having a thin transversely-extending flow-constricting head portion and an elongated stem extending upwardly from said head portion, said float having a specific gravity substantially greater than that of the fluid, and a second metering float disposed within said tube, said second float having a thin transversely-extending flow-constricting head portion and being centrally apertured and mounted for free up-and-down movement along the stem of said first float, said second float having specific gravity only slightly greater than that of the fluid.

7. A device for determining the specific gravity of a moving fluid which comprises a downwardly-tapered metering tube adapted for upward flow of fluid therethrough, a metering float disposed within said tube and adapted for up-and-down movement therewithin responsive to variations in fluid rate-of-flow, said float having a thin transversely-extending flow-constricting head portion and an elongated hollow stem extending upwardly from said head portion, said float having a specific gravity substantially greater than that of the fluid, a second metering float disposed within said tube, said second float having a thin transversely-extending flow-constricting head portion and being centrally apertured and mounted for free up-and-down movement along the stem of said first float, said second float having a specific gravity only slightly greater than that of the fluid, and a thin taut guide-wire extending along the axis of said tube and through said stem.

KERMIT FISCHER.

REFERENCES CITED

The following references are of record in the file of this patent:

UNITED STATES PATENTS

| Number | Name | Date |
| --- | --- | --- |
| 2,252,883 | Everson | Aug. 19, 1941 |
| 2,348,733 | Fischer | May 16, 1944 |
| 1,701,404 | Dennis | Feb. 5, 1929 |
| 1,761,295 | Greenfield | June 3, 1930 |
| 2,025,774 | Rennick et al. | Dec. 31, 1935 |
| 1,424,730 | Linebarger | Aug. 1, 1922 |
| 979,516 | Kuppers | Dec. 27, 1910 |
| 2,333,884 | Porter | Nov. 9, 1943 |
| 2,403,849 | Cox | July 9, 1946 |